(12) United States Patent
Bytheway et al.

(10) Patent No.: US 11,796,302 B2
(45) Date of Patent: Oct. 24, 2023

(54) SIZE DETECTION

(71) Applicant: Cirque Corporation, Salt Lake City, UT (US)

(72) Inventors: Jared Bytheway, Sandy, UT (US); Nate Coy, Woods Cross, UT (US); Brian Monson, Farmington, UT (US); Ethan Sturm, Salt Lake City, UT (US)

(73) Assignee: Cirque Corporation, Sandy, UT (US)

( * ) Notice: Subject to any disclaimer, the term of this patent is extended or adjusted under 35 U.S.C. 154(b) by 485 days.

(21) Appl. No.: 16/747,778

(22) Filed: Jan. 21, 2020

(65) Prior Publication Data

US 2021/0223021 A1      Jul. 22, 2021

Related U.S. Application Data

(63) Continuation of application No. 16/747,317, filed on Jan. 20, 2020.

(51) Int. Cl.
| | | |
|---|---|---|
| *H01M 10/48* | (2006.01) | |
| *G01B 7/06* | (2006.01) | |
| *G06F 3/044* | (2006.01) | |
| *H01M 10/42* | (2006.01) | |

(52) U.S. Cl.
CPC .............. *G01B 7/08* (2013.01); *G06F 3/044* (2013.01); *H01M 10/4257* (2013.01); *H01M 10/48* (2013.01); *G06F 2203/04102* (2013.01); *H01M 2010/4278* (2013.01)

(58) Field of Classification Search
CPC ................... G01B 7/088; G06F 3/044; G06F 2203/04102; H01M 10/4257; H01M 10/48; H01M 2010/4278
See application file for complete search history.

(56) References Cited

U.S. PATENT DOCUMENTS

| | | |
|---|---|---|
| 2009/0274958 A1 | 11/2009 | Fukumine |
| 2014/0002269 A1 | 1/2014 | Zhou |
| 2016/0064780 A1* | 3/2016 | Jarvis ................ H01M 10/4257 429/61 |
| 2016/0116548 A1 | 4/2016 | Ghantous |
| 2017/0324110 A1* | 11/2017 | Fujii ................... H01M 10/617 |
| 2018/0149462 A1 | 5/2018 | Ghantous |
| 2018/0261824 A1* | 9/2018 | Ju ......................... H02J 7/0047 |

\* cited by examiner

*Primary Examiner* — James Lee (57) ABSTRACT

A capacitance sensor may be positioned to detect size changes in objects. The sensor may be constructed with to use mutual capacitance or self-capacitance to detect the size changes.

11 Claims, 10 Drawing Sheets

Determine a capacitance between a first electrode incorporated into a battery assembly and a second electrode incorporated into the battery assembly —1402

Determine a capacitance between a first electrode incorporated into a battery assembly and a second electrode incorporated into the battery assembly —1502

Send an alert when capacitance between the first electrode and the second electrode reaches a predetermined value threshold —1504

SIZE DETECTION

CROSS REFERENCE TO RELATED APPLICATIONS

The present Application is a continuation of U.S. patent application Ser. No. 16/747,317 by Jared Bytheway et al., entitled "Battery Swell Detection," filed on Jan. 20, 2020, assigned to the assignee hereof, and expressly incorporated by reference herein.

FIELD OF THE DISCLOSURE

This disclosure relates generally to systems and methods for detecting a size. In particular, this disclosure relates to systems and methods for capacitively sensing changes to size.

BACKGROUND

A change in a size may depict a condition that is useful to know. For example, changes in the size of certain device components may indicate that a part is nearing a failure or indicate the presence of a dangerous situation. Lithium-ion (Li-ion) batteries are often used in numerous consumer, military, and aerospace electronic goods such as laptops, cellular phones, satellites, spacecraft, and the like. Li-ion batteries can present safety hazards because they contain a flammable electrolyte (typically a Li salt) and may need to be kept pressurized. Li-ion batteries can swell as they start to get old and degrade.

A swollen battery is a potentially dangerous problem in devices that have a restricted space constraint. Traditionally, laptops, for example, enclosed batteries in rigid plastic or metal cases that confined any swelling and prevented it from pushing into other parts of the laptop. Typical battery packs may include of a few individual battery cells. Presently, as laptops have become thinner and lighter, individual battery cells are often encapsulated in a vacuum sealed plastic pouch or bag, and if the battery cell swells the battery pack pushes on components around it. This typically means it pushes on the keyboard and/or the touchpad. Forces from a swollen battery can be quite large and can cause mechanical damage. Other drawbacks, disadvantages, and inconveniences of present systems and methods also exist.

SUMMARY

In some embodiments, a portable electronic device may include a first capacitance sensor, a controller programmed to detect a touch input and/or a proximity input measured from the first capacitance sensor, a second capacitance sensor in communication with the controller, and a battery assembly in communication with the second capacitance sensor. The second capacitance sensor is programmed to detect swelling of the battery assembly.

The first capacitance sensor may be incorporated into a track pad.

The second capacitance sensor may be located between the track pad and the battery assembly.

The second capacitance sensor may be located between a structural feature of the portable electronic device and the battery assembly.

The second capacitance sensor may be connected to an underside of the track pad.

The second capacitance sensor may be in physical contact with at least one cell of the battery assembly.

The second capacitance sensor may be in physical contact with each cell of the battery assembly.

The first capacitance sensor may be a touch screen.

The second capacitance sensor may include a first electrode and a compressible material between the first electrode and the battery assembly. The capacitance measured with the first electrode may be based on size of the compressible material.

The second capacitance sensor may include a second electrode. The first electrode and the second electrode may be located adjacent a first side of the compressible material.

The portable electronic device may include a floating coupler. The floating coupler may be adjacent a second side of the compressible material that is opposite of the first side of the compressible material.

The portable electronic device may include a second electrode. The compressible material may be located between the first insulator and the second insulator and the capacitance measured with the first electrode may be based on a distance between the first electrode and the second electrode.

In one embodiment, a portable electronic device may include a controller programmed to detect a touch input and/or a proximity input measured from a track pad of the portable electronic device and detect swelling of a battery assembly incorporated into the portable electronic device from a capacitance sensor incorporated into the portable electronic device.

The capacitance sensor may be located between the track pad and the battery assembly.

The capacitance sensor may be located between a structural feature of the portable electronic device and the battery assembly.

The capacitance sensor may be connected to the track pad.

The capacitance sensor may be in physical contact with at least one cell of the battery assembly.

The capacitance sensor may be in physical contact with each cell of the battery assembly.

In one embodiment, a computer-program product for use in a portable electronic device may include a non-transitory computer-readable medium storing instructions executable by a processor to detect a touch input and/or a proximity input measured from a track pad of the portable electronic device and detect swelling of a battery assembly incorporated into the portable electronic device from a capacitance sensor incorporated into the portable electronic device.

The capacitance sensor may be located between a structural feature of the portable electronic device and the battery assembly.

In one embodiment, an apparatus may include an object, a compressible material in mechanical communication with the object, an electrode in mechanical communication with the compressible material, and a controller programmed to detect a change in capacitance measured with the electrode when a size of the object changes to change the thickness of the compressible material.

The compressible material may be 0.1 to 5 millimeters thick.

The compressible material may be a foam, a rubber, a foam rubber, or combinations thereof.

The electrode may be located on a first insulator.

The apparatus may include a second electrode and a second insulator on which the second electrode is located. The compressible material may be located between the first insulator and the second insulator and the capacitance measured with the electrode may be based on a distance between the first electrode and the second electrode.

The apparatus may include a second electrode located on the first insulator. The first insulator may have a bendable region that is configured to bend around the object.

The apparatus may include a second electrode. The first electrode and the second electrode may be located adjacent a first side of the compressible material.

The apparatus may include a floating coupler. The floating coupler may be adjacent a second side of the compressible material that is opposite of the first side of the compressible material.

The capacitance measured with the electrode may be a self-capacitance measurement.

The thickness of the compressible material may be configured to shrink when the object expands.

The thickness of the compressible material may be configured to expand when the object contracts.

The object may be prone to expanding when a portion of the object out gasses.

The object may be a battery assembly.

The size of the object may be changeable due to temperature.

The size of the object may be prone to change due to humidity.

In one embodiment, an apparatus may include a battery assembly, a compressible material in mechanical communication with the battery assembly, an electrode in mechanical communication with the compressible material, and a controller programmed to detect a change in capacitance measured with the electrode when a size of the battery assembly changes due to out gassing which causes the compressible material to compress.

The compressible material may be a foam.

The apparatus may include a second electrode and a second insulator on which the second electrode is located. The compressible material may be located between the first insulator and the second insulator and the capacitance measured with the electrode may be based on a distance between the first electrode and the second electrode.

The apparatus may include a second electrode located on the first insulator. The first insulator may have a bendable region and may be configured to bend around the object.

The apparatus may include a second electrode where the first electrode and the second electrode are located adjacent a first side of the compressible material and a floating coupler where the floating coupler is adjacent a second side of the compressible material that is opposite of the first side of the compressible material.

In one embodiment, a battery assembly may include an electrochemical structure, a pouch disposed around the electrochemical structure, a first electrode incorporated into the battery assembly, a second electrode incorporated into the battery assembly, and a controller in communication with the first and second electrode programed to measure a capacitance between the first electrode and second electrode.

The second electrode may be incorporated into the pouch.

The second electrode may be movable with the pouch.

The first electrode may be affixed to the electrochemical structure.

The first electrode may be incorporated into the pouch.

The first electrode may be a sense electrode disposed within the pouch and the second electrode is a transmit electrode incorporated into the pouch.

The controller may be programmed to send an alert when a capacitance between the first electrode and the second electrode reaches a predetermined value.

The battery assembly may include a floating coupler movable with the pouch.

At least one of the first electrode and second electrode may be fixed to a reference surface within the pouch and a distance between the floating coupler and at least one of the first electrode and the second electrode affects a capacitance between the first electrode and the second electrode.

An electrode may be shared with a battery terminal.

The reference surface may be part of the electrochemical structure.

In one embodiment, a computer-program product associated with a battery assembly may include a non-transitory computer-readable medium storing instructions executable by a processor to determine a capacitance between a first electrode incorporated into the battery assembly and a second electrode incorporated into the battery assembly.

The instructions may be executable by a processor to send an alert when capacitance between the first electrode and the second electrode reaches a predetermined value threshold.

At least one of the first electrode and the second electrode may be incorporated into the pouch.

The computer-program product may include a floating coupler disposed within the battery assembly and movable with the pouch where a distance between at least one of the first electrode and the second electrode affects a capacitance between the first electrode and the second electrode.

In one embodiment, a battery assembly may include a pouch, a capacitance sensor located at least in part in the pouch, and a controller that is programmed to determine a swell size of the pouch based at least in part on the capacitance measurement of the capacitance sensor.

The capacitance sensor may include at least one electrode that is movable with a portion of the pouch.

The capacitance measurement may be affected by a floating coupler that is movable with at least a portion of the pouch.

A sense electrode of the capacitance sensor may be disposed within the pouch and a transmit electrode of the capacitance sensor is incorporated into the pouch.

The capacitance sensor may be a mutual capacitance sensor with a separate drive and sense electrode.

The capacitance sensor may be a self-capacitance sensor with an electrode configured to both drive a voltage and sense the capacitance measurement.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" generally refers to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "portable electronic device" generally refers to devices that can be transported and includes a battery and electronic components. Examples may include an electric vehicle, a hybrid vehicle, a laptop, a desktop, a mobile phone, an electronic tablet, a personal digital device, a watch, a gaming controller, another device, or combinations thereof. For the purposes of this disclosure, the term "mechanical communication" generally refers to being in direct physical contact or being in indirect physical contact. As an example, a material that is in direct physical contact with an object may touch the object. On the other hand, a material that is in indirect physical contact with the object may include being in direct physical contact with an intervening material (or intervening materials) that is in direct physical contact with the object. In this type of example, when the material is moved, the material may cause the intervening material to move, which causes the object to move.

For the purposes of this disclosure, the term "floating coupler" generally refers to an electrically conductive material that is not grounded. In some cases, the floating coupler may be separated from electrodes with an electrically insulating material. The capacitance measured with the electrodes may be affected based on the distance between the floating coupler and the electrodes.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "touchpad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

While many of the examples below are depicted with reference to a battery size detection system, the system may be applied to detect size changes in any type of objects. For example, the size detection system may be used to detect the size changes of solids, gases, liquids, combinations thereof, or complex devices, such as battery assemblies. In examples with batteries, the batteries may be located in a laptop, mobile device, an electronic tablet, a vehicle, or another type of device. In some cases, the batteries are lithium batteries. But, in other examples, alkaline batteries or other types of batteries may be used.

Figure 1:
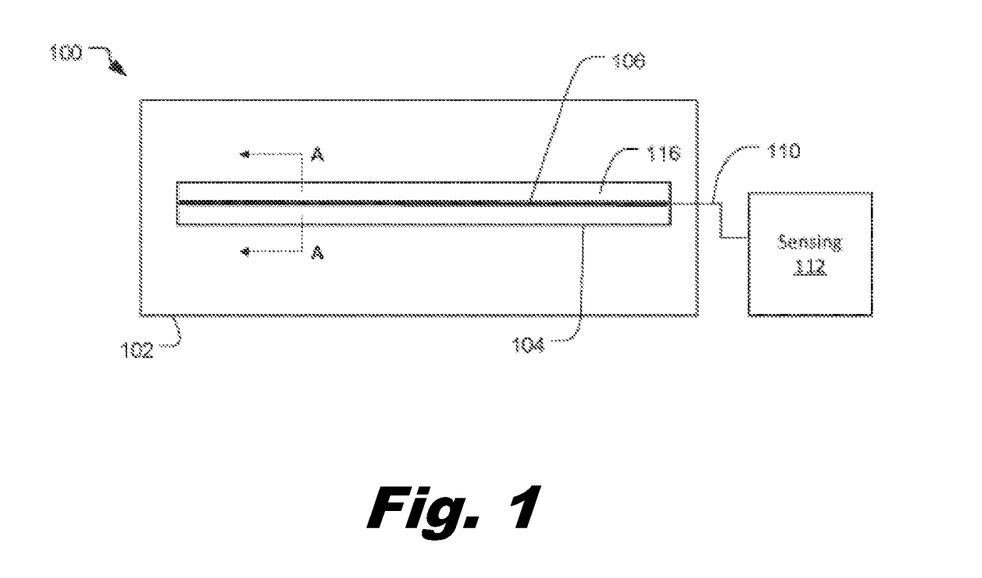
FIG. 1 depicts an example of a size detection system in accordance with the disclosure.

FIG. 1 is a top-down schematic view of a size detection system 100 in accordance with disclosed embodiments. As shown, a disclosed embodiment includes a sensor 104 that is positioned substantially along the length, width, or other dimension of an object, such as a battery 102 or another type of battery. The sensor 104 is constructed with a driven electrode 106 and a sensing electrode 108 (see FIG. 2) that run along a thin strip of insulator 116, such as plastic or the like, and where the electrodes 106, 108, are separated by a thin (e.g., 0.5 mm) insulating and compressible material 114 such as foam rubber, or the like. The sensor 104 is connected to a drive and sensing circuit 112 via connection 110.

Figure 2:
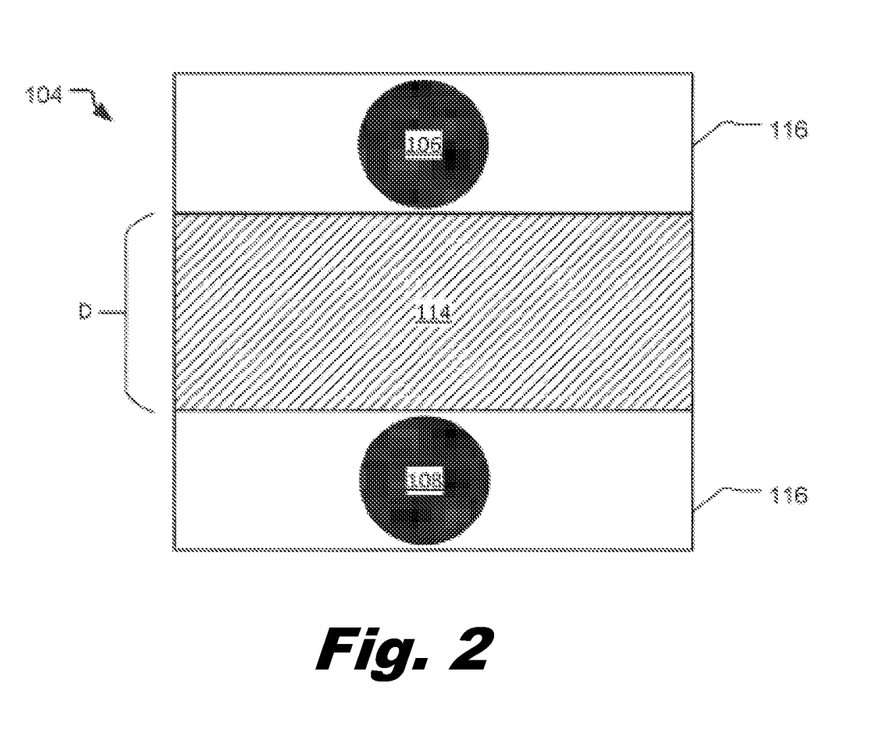
FIG. 2 is a side-view cross-sectional schematic of the portion of the system of FIG. 1 along line A-A.

FIG. 2 is a side-view cross-sectional schematic of the portion of the size detection system 100 of FIG. 1 along line A-A. In this configuration, the sensor 104 is operating in a "mutual capacitance" mode. The compressible material 114 holds the drive electrode 106 and the sense electrode 108 at a constant or fixed separation indicated as D on FIG. 2.

In use, the sensor 104 strip is preferably attached to a reference surface, such as the computer wall, or other relatively immobile support, adjacent to the object. In some cases, it is preferable to have the sensor 104 fill the available space between the object and the reference surface. In examples with a battery 102, a pouch or casing around the electrochemical structure of the battery may fill with venting gases that cause the pouch or casing to expand changing the size of the battery. In this example, as the battery's increased size may fill any open space between the battery 102 and the computer wall. When the space is filled or if there was no open space, the increasing size of the battery may increase the pressure on the sensor 104 strip. As the pressure increases, it exerts a pressure on the sensor 104, causing the foam or other type of compressible material 114 to compress. As the material 114 compresses, the drive electrode 106 moves closer to the sense electrode 108 (i.e., the distance D decreases) which increases the capacitive coupling between the two electrodes. The increased signal that is coupled onto the sense electrode 108 from the drive electrode 106 is measured with a sensing circuit 112. Embodiments of the sensing circuit 112 may notify a computer, or other processor, which can in turn notify the user that the battery 102 needs to be replaced soon, or else physical damage, or the like, may occur to the computer.

In other examples, this sensor 104 strip could be applied to other components in a computing device, a vehicle, other types of equipment, or combinations thereof. For example, the sensor strip may be applied to a vessel that includes a gas or a liquid. For example, the sensor strip may be applied to the external surface of hoses, tires, balloons, balls, tanks, pouches, casings, other types of vessels and/or structures that expand and contract based on internal pressure, and combinations thereof. As these types of vessels expand, the compressible material may be pushed up against a reference surface, such as a surface in equipment, a tire structure, external housing, and so forth. As the compressible material of the sensor strip is compressed between the reference surface and the vessel, the electrodes in the compressible material may be pushed together indicating the size expansion.

One advantage to using a compressible material is that the force exerted on the sensor can be quantified. For example, the distance between the electrodes and therefore the capacitance measurement can be correlated with a force measurement.

In some cases, the size detection strip may be used to determine that an object has decreased in size. In this example, as the size decreases, the pressure on the compressible material may lessen causing the electrodes to move farther away from each other. In this example, the capacitance measurement between the electrodes may decrease. Thus, in some cases, the sensor strip may be used to determine expansions and contractions of the object. Such a sensor may assist in capturing cyclic size changes, vibrations, absolute size changes, relative size changes, other types of size changes and/or patterns, or combinations thereof.

The object may change based on any appropriate factor. For example, the internal pressure of the object may change based on out gassing, as described with batteries. Other types of objects, other than batteries, may also change size based on out gassing. Out gassing may occur in other types of object when the components of the object experience phase changes, like through evaporation, or other types of chemical reactions. In other examples, the internal pressure of liquid or gas of the object may cause the object to change size. In other examples, size changes due to humidity and/or temperature may be detectable with the sensor strip.

Figure 3:
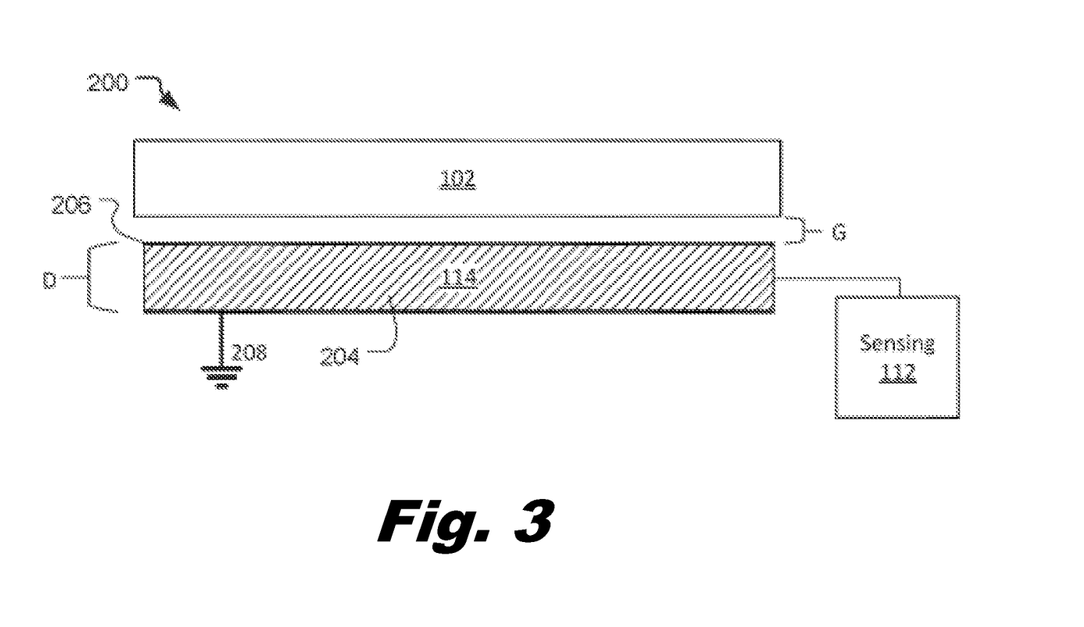
FIG. 3 depicts an example of a size detection system in accordance with the disclosure.

FIG. 3 is a view of a size detection system 200 in accordance with disclosed embodiments. This embodiment of system 200 operates the sensor 204 in a self-capacitance mode. In this configuration, there is one electrode 206 that is driven with a changing voltage, and the parasitic capacitance can be calculated by measuring the current to drive a changing voltage on the electrode 206. Driving and measuring are accomplished by a drive and sensing circuit 112. As shown, the sensor 204 has an electrode 206 on the one side of the foam or other compressible material 114, and ground 208 on the other side. As the battery 102 swells, the foam or compressible material 114 compresses (i.e., distance D gets smaller) which brings the electrode 206 closer to the ground 208 layer, increasing the parasitic capacitance.

As also shown in FIG. 3, if sensor 204 is mounted adjacent to an object, as a battery 102, such that the electrode 206 side is facing the object with a gap in between (indicated as "G" on FIG. 3), the sensor 204 is also sensitive to the size change as it moves closer to the sensor 204 even before it touches the sensor 204. This is a "proximity sensing" mode.

As will be apparent to persons of ordinary skill in the art having the benefit of this disclosure, any of the herein disclosed embodiments may use a sensor (e.g., 104, 204) that is connected to a nearby capacitive touchpad (not shown) that is part of the computer or other processor-based device. For example, the sensor (e.g., 104, 204) may be connected into used, or unused, electrode pins on the touch controller integrated circuit (IC) for the touchpad. Likewise, the sensor (e.g., 104, 204) may be connected to some other microcontroller that has capacitive sensing capability. Further, the sensor (e.g., 104, 204) may have ground traces around the electrodes (e.g., 106, 206) to shield the electrodes from environmental changes. Other configurations are also possible.

Figure 4A:
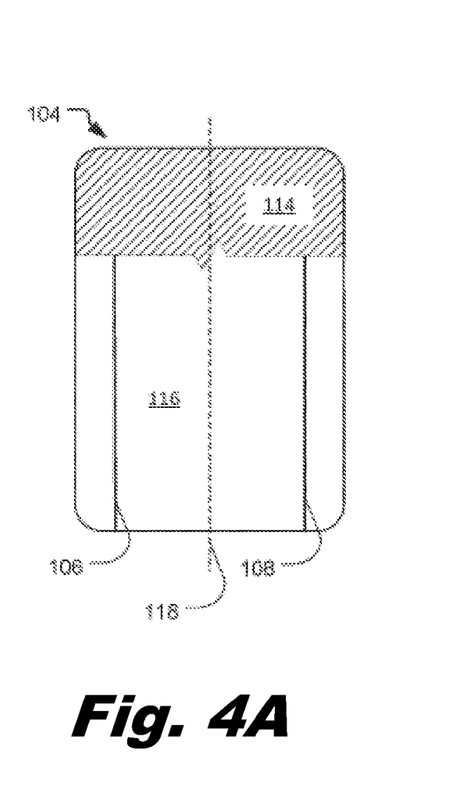
FIG. 4A is a top-down schematic view of a size sensor in accordance with the disclosure.
Figure 4B:
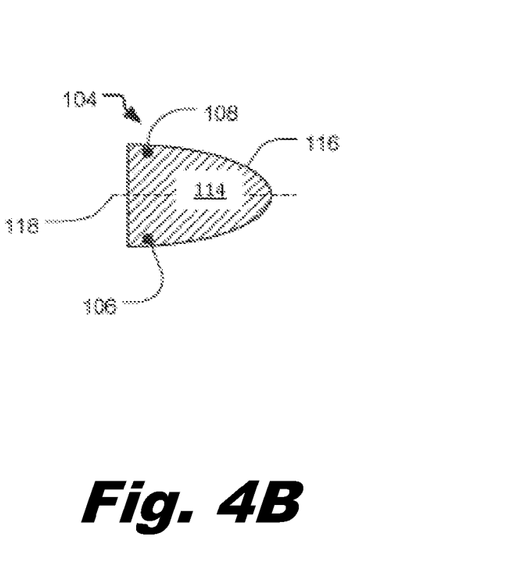
FIG. 4B is a cross-sectional side-view schematic of the size sensor of FIG. 4A in a folded configuration.

FIG. 4A is a top-down view of a battery size sensor 104 in accordance with disclosed embodiments, and FIG. 4B is a cross-sectional side-view of the battery size sensor 104 of FIG. 4A in a folded configuration. As shown, the sensor 104 has an insulator 116 substrate that may be made from a low cost flexible plastic sheet or like. Drive electrode 106 may be located near one edge, and another sense electrode 108 along the opposite edge as shown. Insulating and compressible material 114 (a portion shown in FIG. 4A) may be placed on top of the insulator 116 substrate and the assembly folded in half along bendable region 118 to result in the FIG. 4B configuration. In use, the FIG. 4B configuration operates substantially the same as the embodiment disclosed in connection with FIG. 2.

Figure 5:
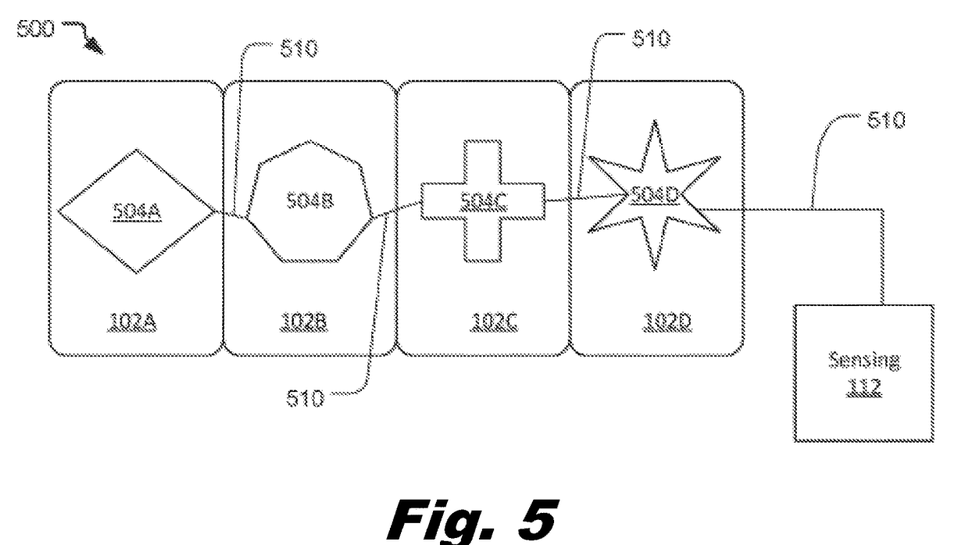
FIG. 5 depicts an example of a multi-cell battery size detection system in accordance with the disclosure.

FIG. 5 is a schematic view of a multi-cell battery size detection system 500 in accordance with disclosed embodiments. As shown for a battery having multiple cells 102A, 102B, 102C, 102D the sensors 504A, 504B, 504C, 504D may have different sizes, shapes, and electrode configurations that make the sensors 504A, 504B, 504C, 504D more sensitive to some areas than other areas. For example, if a battery pack is made with four cells 102A, 102B, 102C, 102D that are mounted in an open frame all in a row, the sensors 504A, 504B, 504C, 504D may have a large area over the center of each cell and each large sensor area might be connected with a thin trace 510 or other low surface area conductor. As one of ordinary skill in the art would understand having the benefit of this disclosure, the shapes, sizes, locations, connections, and the like shown in FIG. 5 are merely exemplary and other configurations may be used. Likewise, mutual capacitance, self-capacitance, proximity sensing, or the like, type sensors may be used in system 500 and different areas might have a different proportion of ground, or drive electrode, to increase shielding from environmental changes or electrical noise.

Figure 6:
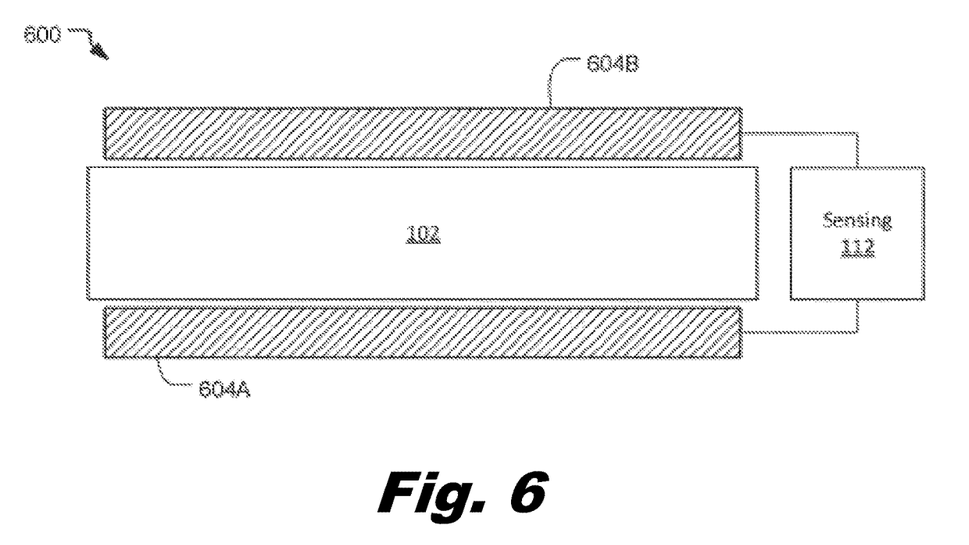
FIG. 6 depicts an example of a size detection system in accordance with the disclosure.

FIG. 6 is a schematic view of a battery size detection system 600 in accordance with disclosed embodiments. As shown, a first sensor 604A may be located under battery 102 and a second sensor 604B may be located above the battery 102. If the battery 102 is in a laptop computer, or the like, the preferred location might be under the palm rest or under the keyboard, or under the main circuit board. In some embodiments, it is preferable to have a sensor (e.g., 604A, 604B) on both sides of the battery 102 including between the battery 102 and the outside computer case or housing. As one of ordinary skill in the art would understand having the benefit of this disclosure, the shapes, sizes, locations, connections, and the like shown in FIG. 6 are merely exemplary and other configurations may be used. Likewise, mutual capacitance, self-capacitance, proximity sensing, or the like, type sensors may be used in system 600.

Figure 7:
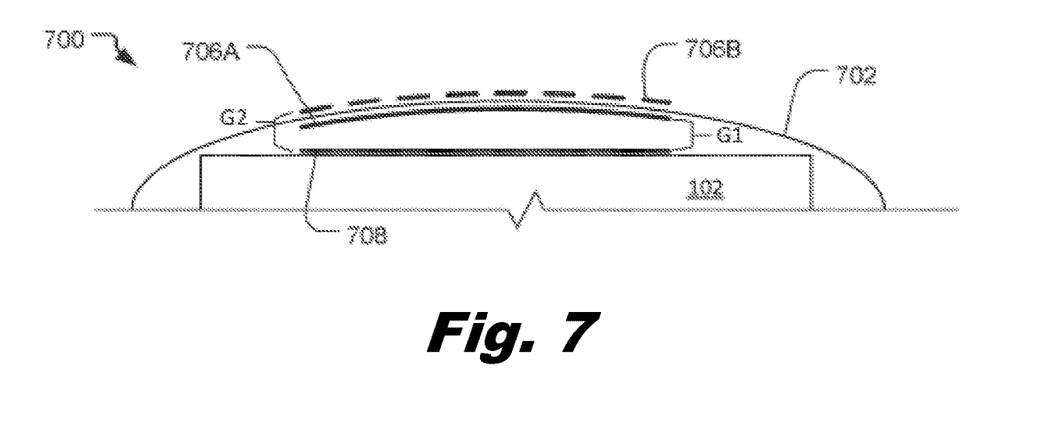
FIG. 7 depicts an example of a size detection system in accordance with the disclosure.

FIG. 7 is a schematic partial view of a battery size detection system 700 in accordance with disclosed embodiments. As shown, a sense electrode 708 may be located on an outer surface of the electrochemical structure of the battery 102. In some cases, the electrochemical structure of the battery includes the metal foils and/or other structural components of the battery. In addition, a drive electrode 706A may be located on the inside of a pouch 702 wall so that the drive electrode 706A is positioned above the sense electrode 708. Alternatively, the drive electrode 706B may be located on the outer surface of the pouch 702 as shown. Further, the locations of sense electrode 708 and drive electrode 706A or 706B may be reversed. Additionally, self-capacitance or proximity sensing configurations may also be used.

In some embodiments, a sensing circuit (not shown in FIG. 7) may be located on a printed circuit board, or the like, within the battery pouch 702, or outside of the pouch 702. In use, the sensing circuit senses a coupling between the drive electrode 706A, 706B and the sense electrode 708 when they are in close proximity. As the battery pouch 702 fills with gases as the battery 102 degrades, the pouch 702 displaces from the battery 102 as indicated schematically on FIG. 7. The displacement also separates the drive electrode 706A, 706B from the sense electrode 708 forming a gap indicated as "G1" (or "G2" for electrode 706B) in FIG. 7. This gap G1, G2 and reduction in coupling between the drive electrode 706A, 706B and the sense electrode 708 is measured with the sensing circuit (not shown), and may be communicated to a battery charging circuit and/or to the computer about the battery 102 status, and the computer or computer operator can take corrective action such as disconnecting the battery to reduce any further swelling. Other corrective actions may also be taken.

In some cases, the electrode associated with the pouch may be located on the outside of the pouch, may be located on the inside of the pouch, may be attached (directly or indirectly) to the inside surface of the pouch so that the electrode moves as the pouch moves, may be incorporated into the thickness of the pouch, or combinations thereof.

Figure 8:
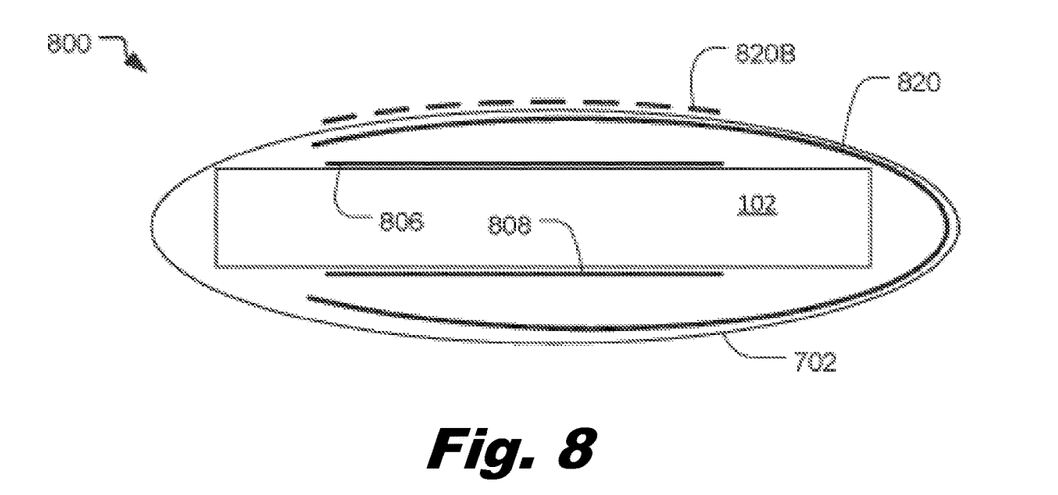
FIG. 8 depicts an example of a size detection system in accordance with the disclosure.

FIG. 8 is a schematic side-view of a battery size detection system 800 in accordance with disclosed embodiments. As shown, an electrode 806 (e.g., a drive electrode) is located on one side of the battery 102. Another electrode 808 (e.g., a sense electrode) is located on the other side of the battery 102. A floating coupler 820 wraps around the battery 102 to couple the drive 806 and sense 808 electrodes and may be located inside a pouch 702 around the battery 102 (or outside pouch 702 as partially indicated by dashed line 820B). Any change in battery size (or swelling of the battery pouch 702) causes coupler 820 (or if outside 820B) to move and the capacitive coupling between electrodes 806, 808 changes and may be detected. Such a configuration increases the sensitivity and senses on all sides of the battery regardless of the battery's location. As will be apparent to those of ordinary skill in the art having the benefit of this disclosure, the locations of electrodes 806, 808 may be switched, a self-capacitance mode using a ground connection may be used, or other configurations may also be used.

Figure 9:
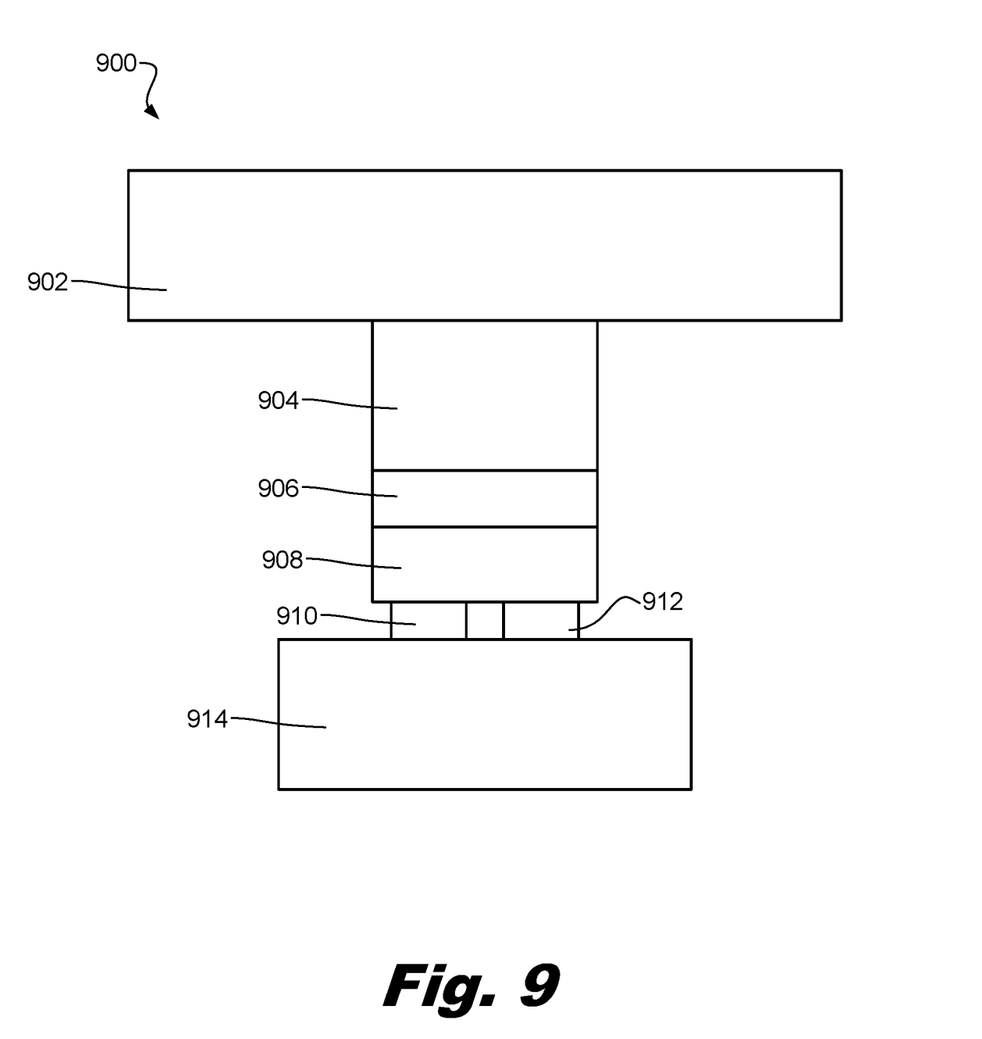
FIG. 9 depicts an example of a size detection system in accordance with the disclosure.

FIG. 9 depicts an example of a size detection system. In this illustrated example, an apparatus 900 includes an object 902, a spacer 904, a floating coupler 906, compressible material 908, a transmit electrode 910, a sense electrode 912, and a substrate 914.

The object 902 may be any appropriate type of object that is prone to changing its size. The size change may occur based, at least in part, on thermal expansion and/or contraction, changes in humidity, chemical changes, out gassing, a portion of the object experiencing a phase change, biological growth, other factors, or combinations thereof. In some examples, the object 902 may be a battery. In other examples, the object may be a tire, a hose, a vessel, a rod, a material, an engine component, a gas tank, a liquid tank, a hydrogen cell, another type of object, or combinations thereof.

The spacer 904 may fill a gap between other portions of the apparatus and the object 902. In some cases, the spacer 904 may provide electrical insulation between the object 902 and the floating coupler 906. However, the floating coupler 906 may be made of any appropriate material, which may be electrically insulating or electrically conductive. In some alternative examples, no spacer 904 is used between the object 902 and the floating coupler 906.

The floating coupler 906 may be made of an electrically conductive material that is not electrically grounded. Any appropriate electrically conducting material may be used. For example, a non-exhaustive list of materials that may be used includes copper, nickel, gold, silver, aluminum, steel, iron, brass, bronze, zinc, other metals, electrically conductive plastics, alloys thereof, mixtures thereof, or combinations thereof.

The compressible material 908 may separate the floating coupler 906 from the electrodes 910, 912. In this example, the floating coupler 906 and the electrodes 910, 912 are located outside of the compressible material 908. However, in alternative examples, at least one of the floating coupler 906, the transmit electrode 910, and the sense electrode 912 may be located within the compressible material 908.

The compressible material 908 may be made of any appropriate material. An example of a non-exhaustive list of materials that may be suitable to be the compressible material may include foam, rubber, foam rubber, an elastomeric material, other types of materials, or combinations thereof. In some cases, the compressible material is configured to compress in one direction. Yet, in other examples, the compressible material is capable of compressing and expanding as the size of the object fluctuates. In some cases, the compressible material is a traditional spring made from steel or plastic. In some cases, the spring may be used in non-traditional ways such as but not limited to the inherent spring of the existing mechanical structure or substrates. In some cases, such as the detection of battery swelling, once the battery has been determined to swell, the battery is may be replaced for safety and health reasons. In this type of application, it is not contemplated that the battery will reduce in size allowing the compressible material to expand. Even if the battery swelling did go down, the battery may already be structurally compromised and pose a safety risk. Thus, in this type of application, the compressible material may not need to be resilient enough to re-expand after compression. However, in other types of applications, it may be desirable that the compressible material be resilient to expand and contract as the object changes sizes. While the description above has identified examples with a battery size detection system that are focused on just determining that a battery has swelled, other applications may include monitoring fluctuating sizes of batteries. In some of these examples constructed to monitor fluctuating sizes, the system may include a compressible material that is capable of expanding and contracting as the battery size increases and decreases.

The transmit electrode 910 and the sense electrode 912 may be located on the substrate 914. In some examples, the transmit electrode 910 provides a voltage which produces a measureable amount capacitance between the transmit electrode 910 and the sense electrode 912. However, the value of capacitance may also be affected by the presence of the floating coupler 906. In some cases, the closer the floating coupler 906 is from the electrodes 910, 912, the greater the effect on the capacitance. With the compressible material 908 separating the floating coupler 906 from the electrodes 910, 912, changes in the size of the compressible material affect the distance between the floating coupler 906 and the electrodes 910, 912.

As the object 902 expands, the compressible material 908 is compressed. With the compressible material 908 compressed, the distance between the floating coupler 906 and the electrode 910, 912 is reduced, which causes an increased change in the capacitance measured with the sense electrode 912. The controller (not shown) may determine that when the sense electrode 912 measures a change in capacitance that the object has increased in size. In some cases, an increased change in capacitance may indicate a size increase in the object 902. In some examples, a decreased change in capacitance may indicated a reduction in size of the object 902. However, in some alternative embodiments, the electrodes, compressible material, object, floating coupler, or other components of the apparatus 900 may be arranged so that a decrease in capacitance indicates an increase in the object size. Similarly, in some arrangements, an increase in the capacitance measured may indicate that the object 902 has reduced in size.

While the example illustrated in FIG. 9 depicts a single transmit electrode 910 and a single sense electrode 912, multiple transmit and/or sense electrodes may be used. Additionally, in some examples, just a single electrode is used to measure capacitance. In such an example, the single electrode may transmit a voltage and measure a parasitic capacitance that results from the transmitted voltage.

Figure 10:
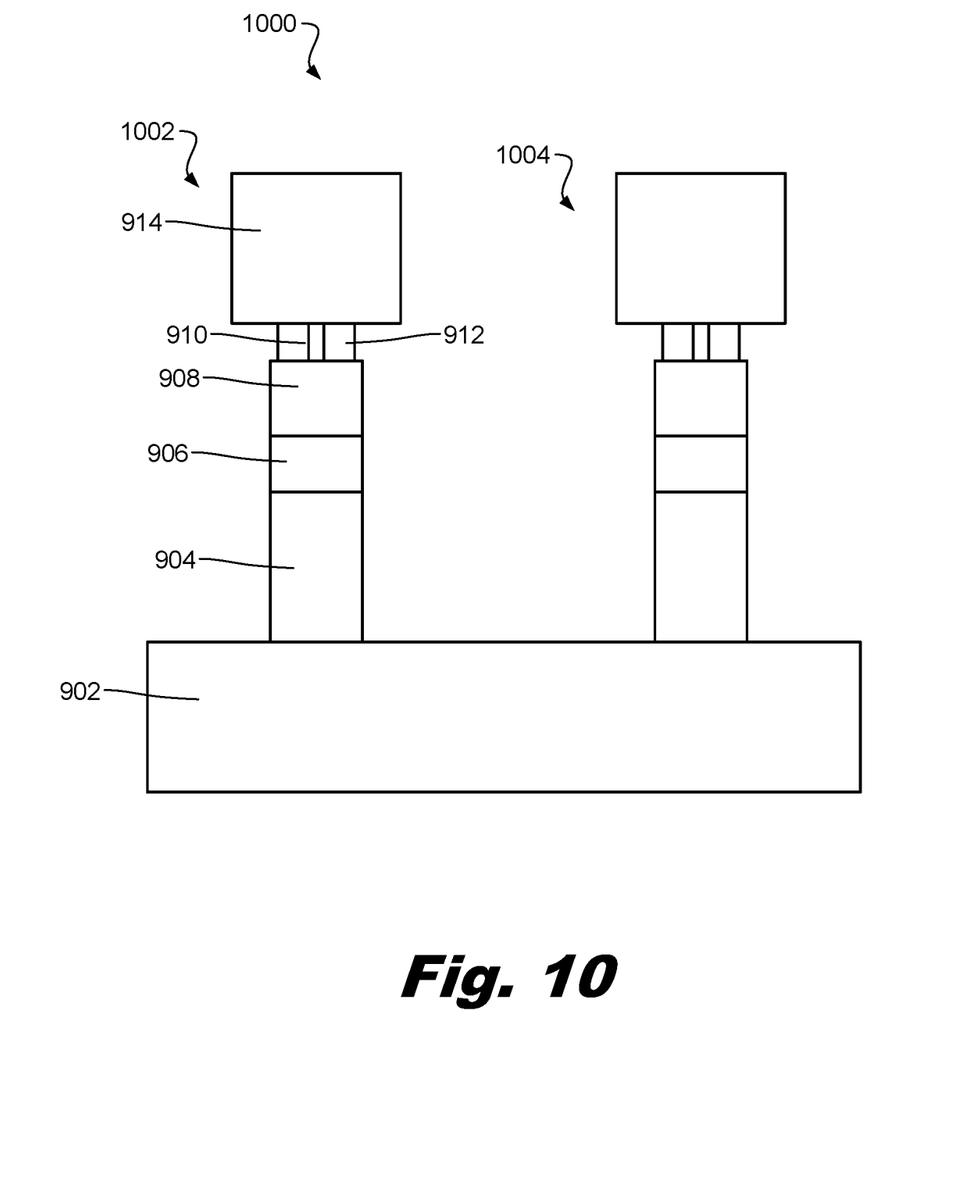
FIG. 10 depicts an example of a size detection system in accordance with the disclosure.

FIG. 10 depicts an example of an apparatus 1000. The apparatus may include a first sensing stack 1002 and a second sensing stack 1004. Each of the sensing stacks 1002, 1004 may include a spacer 904, a floating coupler 906, a compressible material 908, a transmit electrode 910, a sense electrode 912, and a substrate 914 as described in conjunction with FIG. 9. However, the first or second sensing stacks may use any appropriate type of arrangement to detect changes in the sizes of the object as described in conjunction with FIGS. 1-9. Likewise, other sensing arrangements to use capacitance to detect the size changes in objects may be used in at least one of the first and second sensing stacks.

In the illustrated example of FIG. 10, the first and second sensing stacks 1002, 1004 are each positioned to detect size changes of the same object 902. In some examples, the object 902 may increase in size in an asymmetric manner. For examples where the object 902 is a battery assembly with multiple cells, one of the multiple cells may swell while the other battery cells do not. In this situation, a sensing stack that is positioned adjacent a cell or a portion of the battery assembly that is not swelling may not detect the swelling of one of the other cells. In some examples where a multi-cell battery assembly is the object, a sensing stack may be positioned to detect size changes for each of the cells. In other examples where the object is not a battery assembly, but may still be capable of expanding or otherwise changing sizes asymmetrically, multiple sensing stacks may be positioned at different regions of the object to detect size changes at those regions. In some cases, the multiple sensing stacks may be used to determine relative size changes or absolute size changes.

Figure 11:
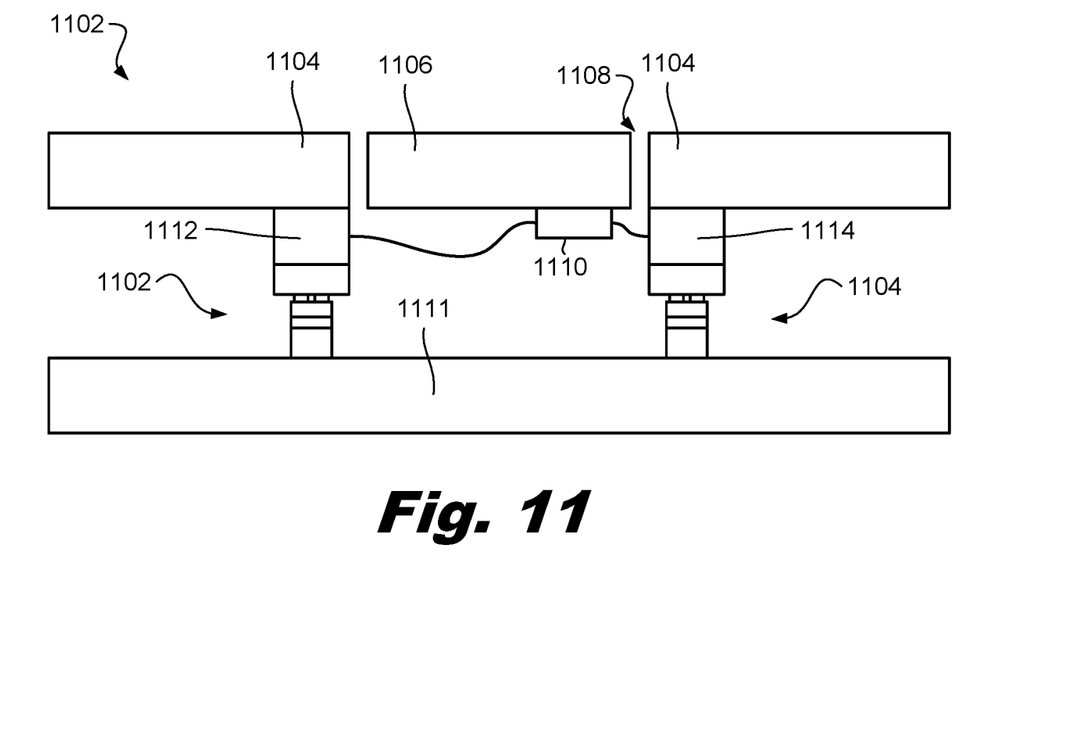
FIG. 11 depicts an example of a size detection system incorporated into an electronics device in accordance with the disclosure.

FIG. 11 depicts an example of a size detection system 1100 incorporated into an electronic device 1102. In this example, the size detection system 1100 includes a first sensing stack 1002 and a second sensing stack 1004 incorporated into a structure of the electronic device 1102.

The electronic device 1102 includes a keyboard surface 1104, a track pad assembly 1106 positioned in an opening 1108 defined in the keyboard surface 1104, and a controller 1110 incorporated into the track pad assembly 1106. The track pad assembly 1106 may include a sensor that includes at least one electrode for determining a proximity input over the track pad assembly 1106 or a touch input on to the touch pad assembly 1106. The controller 1110 may determine capacitance measurements from the electrode to determine the proximity and/or touch inputs of the track pad assembly 1106.

The first sensing stack 1002 and the second sensing stack may be positioned to detect a size change in a battery assembly 1111 of the electronic device 1102. The first sensing stack 1002 may be positioned between a first post 1112 of the electronic device's structure, and the second sensing stack 1004 may be positioned between a second post 1114 of the electronic device's structure. Each of the first post 1112 and the second post 1114 may provide a reference surface against which the respective sensing stacks may push against as portions of a battery assembly 1111.

In this example, the first sensing stack 1002 and the second sensing stack 1004 are in communication with the controller 1110 of the track pad assembly 1106. Thus, the circuitry, firmware, and other resources of the track pad assembly's controller 1110 may be used to interpret the measurements from the first sensing stack 1002 and the second sensing stack 1004. In alternative examples, one of the first sensing stack 1002 and the second sensing stack 1004 may be in communication with a dedicated controller for interpreting their respective measurements.

Figure 12:
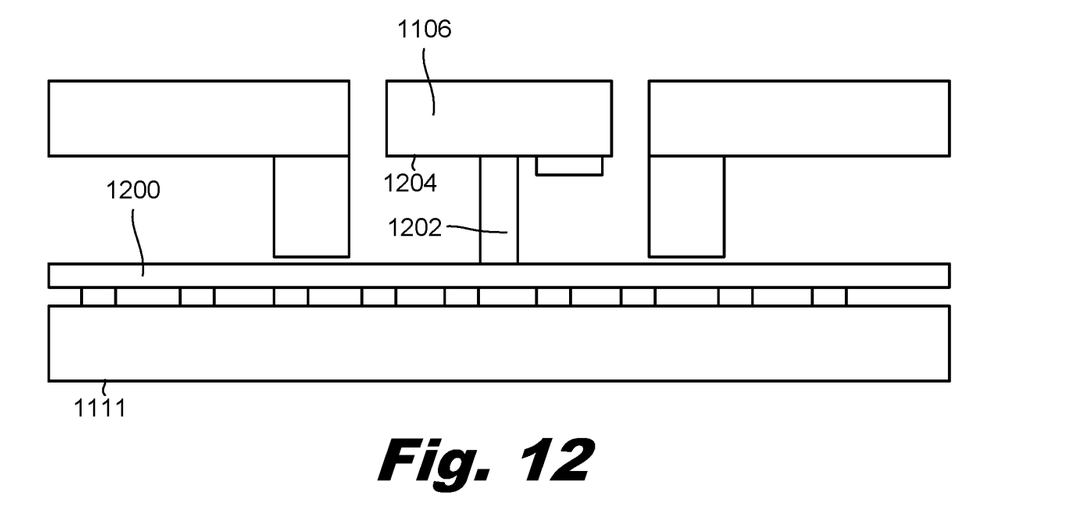
FIG. 12 depicts an example of a size detection system incorporated into an electronics device in accordance with the disclosure.

In the illustrated example of FIG. 11, the region of the battery assembly 1111 immediately subjacent to the track pad assembly 1106 is void of a sensing stack. However, in the embodiment illustrated in FIG. 12, a sensing strip 1200 is positioned over the length of the battery assembly 1111. The sensing strip 1200 may include components and arrangements similar to the arrangements described in conjunction with the examples from FIGS. 1-10 or another type of capacitance sensing arrangement configured to detect size changes. In this example, connector 1202 connects the sensing strip 1200 to the underside 1204 of the track pad assembly 1106. The connector 1202 may provide physical resistance as the battery assembly 1111 swells causing the compressible material to compress. In some examples, the connector 1202 may electrically connect the sensing strip 1200 to the controller 1110 of the track pad assembly 1106. In this particular example, the controller 1110 may process both the inputs to the track pad assembly 1106 and the inputs from the sensing strip 1200.

Figure 13:
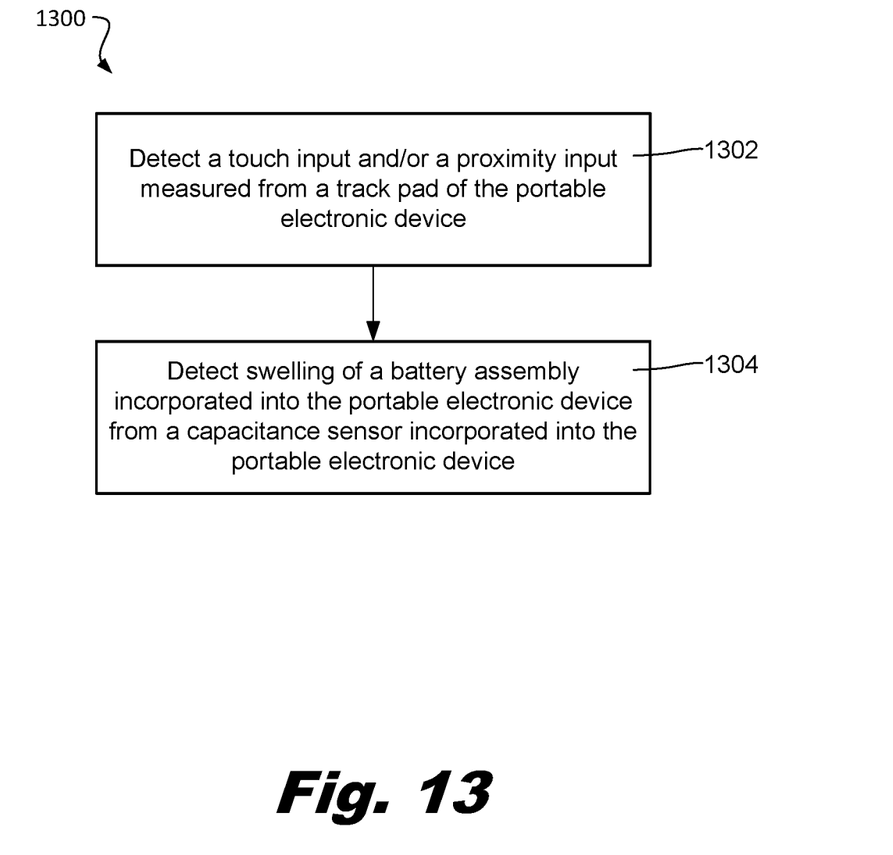
FIG. 13 depicts an example of a method for detecting battery swelling in accordance with the disclosure.

FIG. 13 depicts an example of a method 1300 for detecting battery swelling. This method 1300 may be performed based on the description of the devices, module, and principles described in relation to FIGS. 1-12. In this example, the method 1300 includes detecting 1302 a touch input and/or a proximity input measured from a track pad of the portable electronic device, and detecting 1304 swelling of a battery assembly incorporated into the portable electronic device from a capacitance sensor incorporated into the portable electronic device.

Figure 14:
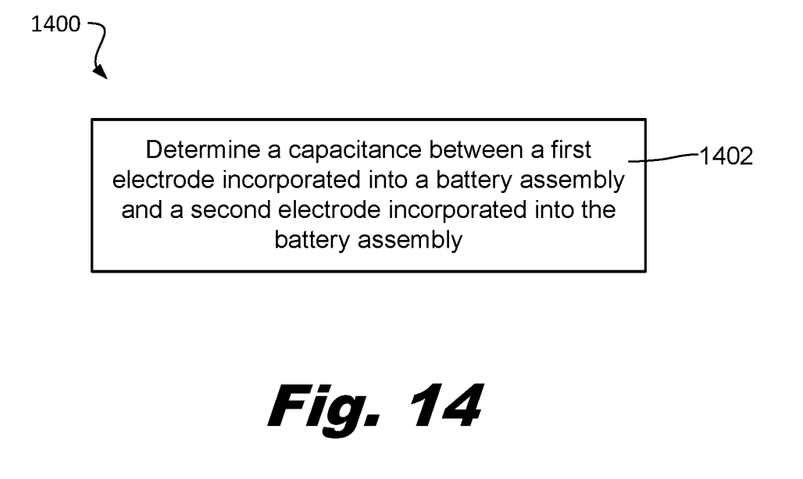
FIG. 14 depicts an example of a method of a battery in accordance with the disclosure.

FIG. 14 depicts an example of a method 1400 of a battery. This method 1400 may be performed based on the description of the devices, module, and principles described in relation to FIGS. 1-12. In this example, the method 1400 includes determining 1402 a capacitance between a first electrode incorporated into a battery assembly and a second electrode incorporated into the battery assembly.

Figure 15:
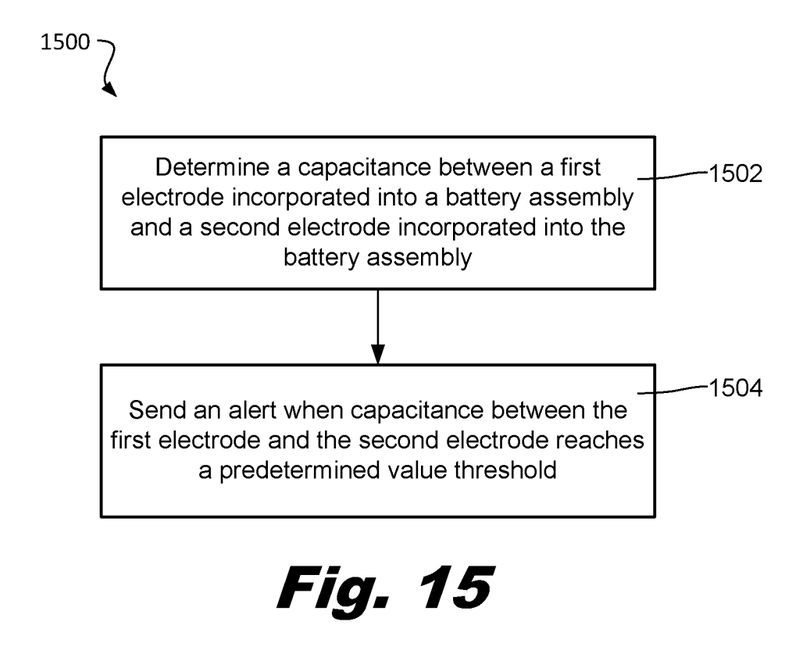
FIG. 15 depicts an example of a method of a battery in accordance with the disclosure.

FIG. 15 depicts an example of a method 1500 of a battery. This method 1500 may be performed based on the description of the devices, module, and principles described in relation to FIGS. 1-12. In this example, the method 1500 includes determining 1502 a capacitance between a first electrode incorporated into a battery assembly and a second electrode incorporated into the battery assembly, and sending 1504 an alert when capacitance between the first electrode and the second electrode reaches a predetermined value threshold.

Figure 16:
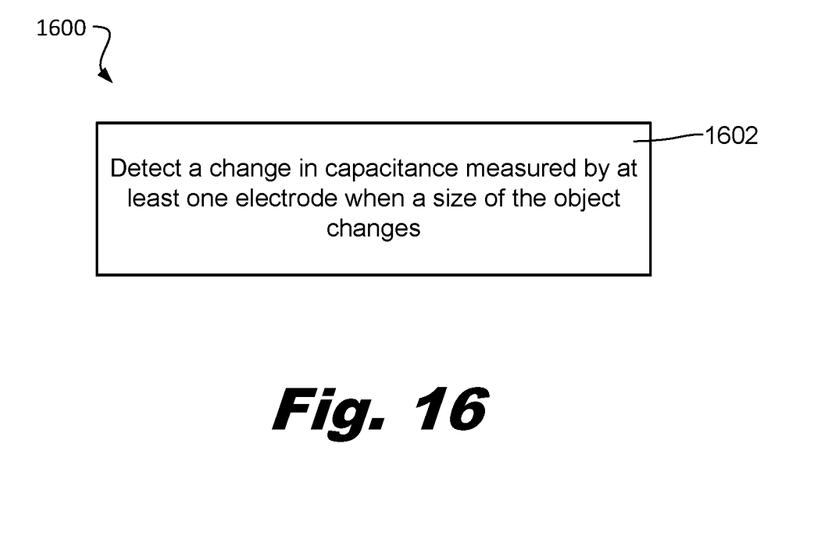
FIG. 16 depicts an example of a method of detecting a size change in accordance with the disclosure.

FIG. 16 depicts an example of a method 1600 of detecting a size change. This method 1600 may be performed based on the description of the devices, module, and principles described in relation to FIGS. 1-12. In this example, the method 1600 includes detecting 1602 a change in capacitance measured by at least one electrode when a size of the object changes.

The electronic device with the touch pad may be a laptop, a desk top, an external pad for providing input to a computing device or to the cloud computing device, a computing device, a networked device, an electronic tablet, a mobile device, a personal digital assistant, a control panel, a gaming device, a flat panel, a display, a television, another type of device, or combination thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A laptop, comprising:
a keyboard surface including a keyboard and a palm rest;
a battery located under a palm rest of a keyboard surface;
a track pad assembly positioned in an opening defined in the keyboard surface;
an electrode in a sensing strip adjacent to the battery and independent of and spaced away from an underside of the track pad assembly at a distance; and
a controller programmed to detect a change in capacitance measured with the electrode when a size of the battery changes; and
a structure where the structure spaces the electrode away from the underside of the track pad assembly;
wherein the structure is a post.

2. The laptop of claim 1, further comprising a compressible material in communication with the battery.

3. The laptop of claim 2, wherein the compressible material is a foam, a rubber, a foam rubber, or combinations thereof.

4. The laptop of claim 2, wherein the electrode is located on a first insulator.

5. The laptop of claim 4, further comprising:
a second electrode; and
a second insulator on which the second electrode is located;
wherein the compressible material is located between the first insulator and the second insulator;
wherein the capacitance measured with the electrode is based on a distance between the electrode and the second electrode.

6. The laptop of claim 4, further comprising:
a second electrode located on the first insulator;
wherein the first insulator has a bendable region and is configured to bend around the battery.

7. The laptop of claim 2, further comprising:
a second electrode;

wherein the electrode and the second electrode are located adjacent a first side of the compressible material.

8. The laptop of claim 7, further comprising:
a floating coupler;
wherein the floating coupler is adjacent a second side of the compressible material that is opposite of the first side of the compressible material.

9. The laptop of claim 1, wherein the capacitance measured with the electrode is a self-capacitance measurement.

10. The laptop of claim 1, wherein the electrode is incorporated into the sensing strip that is independent of the track pad assembly and spaced apart from the track pad assembly at a distance.

11. The laptop of claim 10, further comprising a second electrode incorporated into a second sensing strip that is independent of the track pad assembly and spaced apart from the track pad assembly at a distance;
wherein the first sensing strip and the second sensing strip are positioned to detect size changes of the battery.

* * * * *